United States Patent
Nicolas et al.

(10) Patent No.: US 12,366,530 B2
(45) Date of Patent: Jul. 22, 2025

(54) METHOD AND DEVICE FOR DETERMINING UV COVERAGE ON IRRADIATION TARGET IN REAL TIME

(71) Applicant: L'Oreal, Paris (FR)

(72) Inventors: Alexandre Nicolas, Kawasaki-shi (JP); Chin Kai Lee, Kawasaki-shi (JP); Charlotte Pellet, Kawasaki-shi (JP); Woo Ram Park, Kawasaki-shi (JP)

(73) Assignee: L'Oreal, Paris (FR)

( * ) Notice: Subject to any disclaimer, the term of this patent is extended or adjusted under 35 U.S.C. 154(b) by 148 days.

(21) Appl. No.: 18/253,016

(22) PCT Filed: Nov. 12, 2021

(86) PCT No.: PCT/JP2021/042510
§ 371 (c)(1),
(2) Date: May 15, 2023

(87) PCT Pub. No.: WO2022/107869
PCT Pub. Date: May 27, 2022

(65) Prior Publication Data
US 2023/0417670 A1    Dec. 28, 2023

(30) Foreign Application Priority Data

Nov. 18, 2020 (JP) .................................. 2020-191598
Dec. 14, 2020 (FR) ........................................ 2013137

(51) Int. Cl.
*G01N 21/64* (2006.01)
*G01N 21/84* (2006.01)

(52) U.S. Cl.
CPC ..... *G01N 21/6408* (2013.01); *G01N 21/8422* (2013.01); *G01N 2021/6419* (2013.01); *G01N 2021/8427* (2013.01)

(58) Field of Classification Search
None
See application file for complete search history.

(56) References Cited

U.S. PATENT DOCUMENTS

2006/0244961 A1\* 11/2006 Cole ...................... A61B 5/441
                                                                                    356/319
2011/0300572 A1    12/2011 Dueva-Koganov et al.

FOREIGN PATENT DOCUMENTS

JP        2011080915 A * 4/2011
JP        2011137734 A * 7/2011
(Continued)

OTHER PUBLICATIONS

Sergei R. Utz et al., Optical and Imaging Techniques for In Vivo Sunscreens Investigation, SPIE, 1996, vol. 2628, 323 (12 pages).
(Continued)

*Primary Examiner* — Marcus H Taningco
(74) *Attorney, Agent, or Firm* — CHRISTENSEN O'CONNOR JOHNSON KINDNESS PLLC

(57) ABSTRACT

A method for determining UV coverage on an irradiation target in real time comprises the steps of irradiating an irradiation target (10) with light including UV light (16) immediately after applying a sunscreen (12); detecting an amount of fluorescent light (20) emitted from the irradiation target in response to the light irradiation and storing the amount of the fluorescent light as reference data; irradiating the irradiation target (10) with the light including UV light (16) after a predetermined passage of time, or after applying a predetermined stress on the sunscreen (12); detecting an amount of fluorescent light (20) emitted from the irradiation target in response to the light irradiation and storing the amount of the fluorescent light as measurement data; and determining UV coverage by dividing the amount of the fluorescent light of the reference data by the amount of the fluorescent light of the measurement data, wherein the (Continued)

irradiation target (10) includes at least one substance emitting fluorescent light in response to the light irradiation.

12 Claims, 4 Drawing Sheets

(56) References Cited

FOREIGN PATENT DOCUMENTS

| JP | A-2016-167197 | 9/2016 |
| JP | A-2017-146211 | 8/2017 |
| JP | 2019-100741 | 6/2019 |
| JP | A-2019-528136 | 10/2019 |
| KR | 101170039 B1 * | 8/2012 |
| WO | WO 2012/017604 | 2/2012 |
| WO | WO 2019/187910 | 10/2019 |
| WO | A-2020-091297 | 6/2020 |

OTHER PUBLICATIONS

International Search Report as mailed on Feb. 16, 2022, issued in corresponding International Application No. PCT/JP2021/042510, Nov. 12, 2021, (2 pages).
Office Action for Japanese Application No. 2020-191598, mailed Jan. 28, 2025.

* cited by examiner

FIG. 3
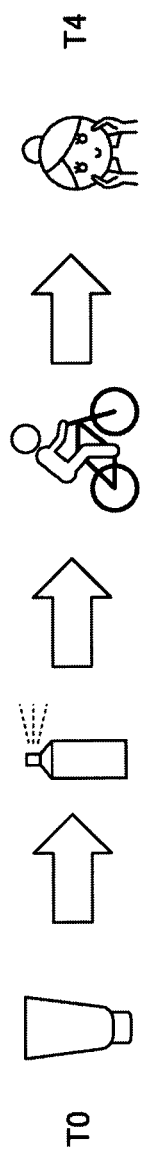
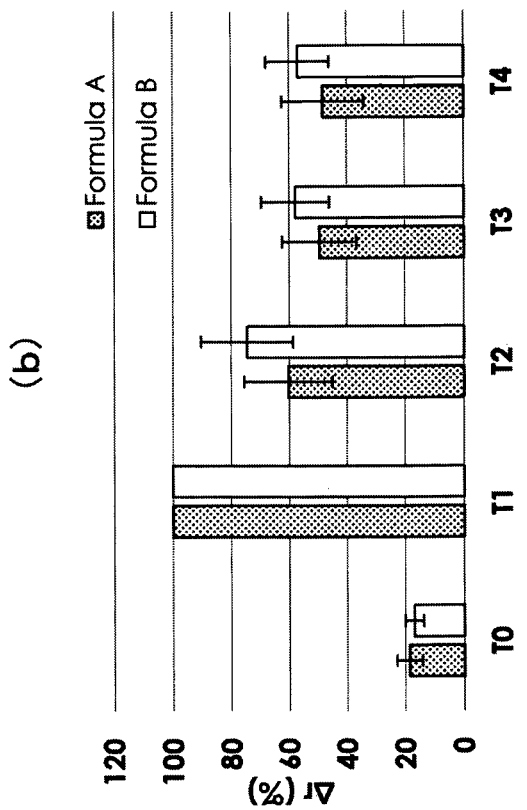
(b)
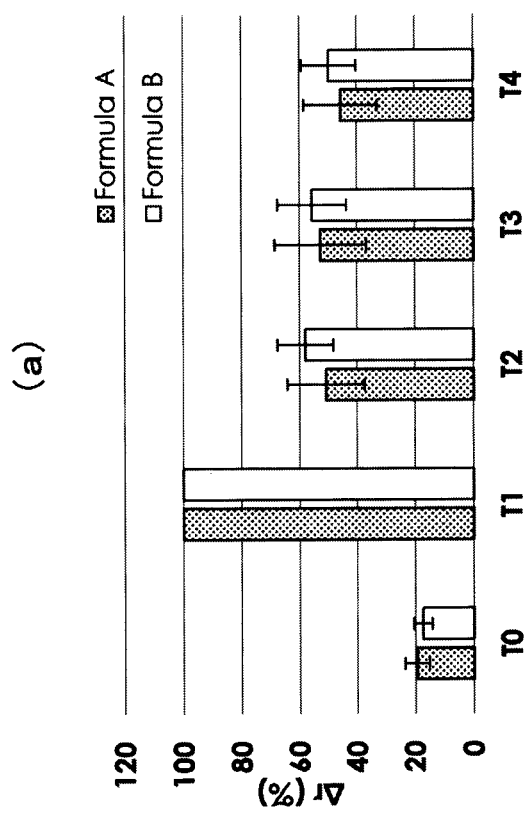
(a)

FIG. 4
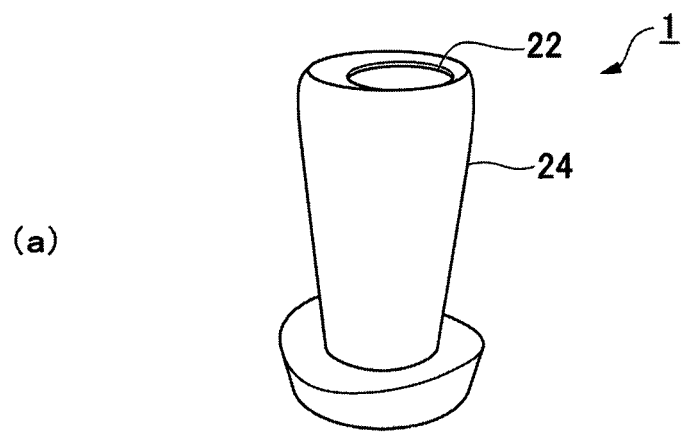
(a)
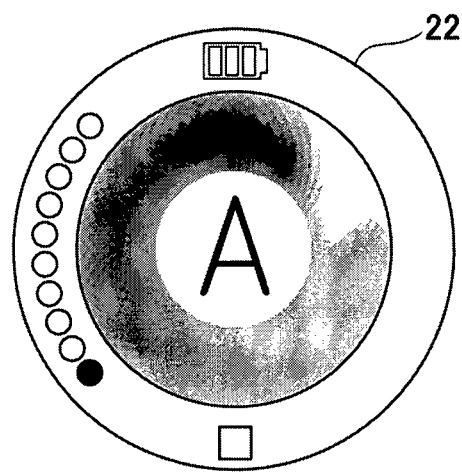
(b)
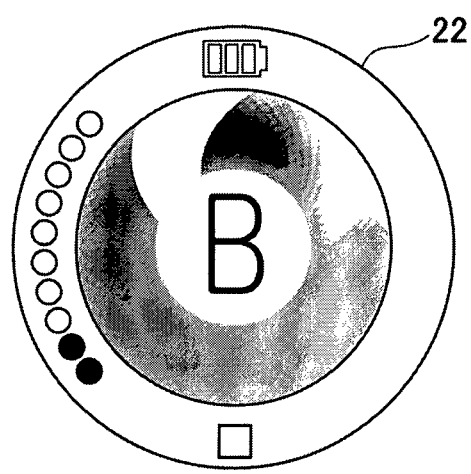
(c)

METHOD AND DEVICE FOR DETERMINING UV COVERAGE ON IRRADIATION TARGET IN REAL TIME

CROSS-REFERENCE TO RELATED APPLICATION

This application is a National Stage of International Application No. PCT/JP2021/042510, filed Nov. 12, 2021, which claims the benefit of Japanese Application No. 2020-191598, filed Nov. 18, 2020, which claims the benefit of French Application No. FR 2013137, filed Dec. 14, 2020, the entire contents of which are incorporated by reference herein in their entirety.

TECHNICAL FIELD

The present invention relates to a method and a device for determining UV coverage on an irradiation target in real time.

BACKGROUND

Protection of an irradiation target such as human skin from ultraviolet light (UV protection) is important for skin health and beauty. After a formulation having a UV protection effect, i.e., sunscreen is applied to an irradiation target, the sunscreen will eventually be removed by stresses on the sunscreen such as wiping the irradiation target with a towel, or by the passage of time. For an effective protection of the irradiation target, it is necessary to measure a current UV protection effect. However, since ultraviolet light is invisible to the human eye, the UV protection effect is also invisible. Therefore, a consumer cannot visually check the degree to which the UV protection effect is maintained.

When an irradiation target is irradiated with UV light, fluorescent substances such as collagen, NADPH, and amino acids included in the irradiation target emit, for example, fluorescent light in a visible range. An amount of UV light achieving the irradiation target, in other words, the UV protection effect of the sunscreen applied to the irradiation target can be determined by measuring the amount of the fluorescent light.

Conventional methods for determining the UV protection effect comprise the following steps. First, an irradiation target before applying a sunscreen is irradiated with UV light, and an amount of emitted fluorescent light is stored as a reference value. Then, the irradiation target after applying the sunscreen is irradiated with UV light, and an amount of emitted fluorescent light is stored as a measurement value. Since the UV light impinging the irradiation target is absorbed and/or scattered by the sunscreen, the amount of the fluorescent light emitted from the irradiation target and measured is reduced. Reduction of the measured value compared with the reference value is determined as a UV coverage. When a predetermined time has elapsed from the application of the sunscreen or a predetermined stress such as wiping with a paper towel is applied to the sunscreen, the reduction of the measurement value compared with the reference value becomes smaller due to the reduction of the applied sunscreen and so on. Therefore, the UV protection effect of the sunscreen can be evaluated from the UV coverage.

However, it is known that even a slight drop of the UV protection effect of the sunscreen has a significant impact on the irradiated target. For example, an SPF 50+ sunscreen has a UV coverage more than 98%, while an SPF 30+ sunscreen has a UV coverage more than 95%. Although the difference between the UV coverages of the SPF 50+ sunscreen and the SPF 30+ sunscreen is very slight, the amount of the UV light reaching the irradiation target may be more than twice as much from a user's point of view. Therefore, in order to provide more precise and intuitive information for a user, a more user-oriented method of determining a change of UV coverage of an irradiation target is required.

SUMMARY OF INVENTION

The present invention provides a method and a device for determining a UV coverage on an irradiation target in real time.

Means for Solving the Problem

A first embodiment according to the present invention provides a method for determining UV coverage on an irradiation target in real time, comprising steps of:
  irradiating an irradiation target with light immediately after applying a sunscreen;
  detecting an amount of fluorescent light emitted from the irradiation target in response to the light irradiation and storing the amount of the fluorescent light as reference data;
  irradiating the irradiation target with light after a predetermined passage of time, or after applying a predetermined stress on the sunscreen;
  detecting an amount of fluorescent light emitted from the irradiation target in response to the light irradiation and storing the amount of the fluorescent light as measurement data; and
  determining UV coverage by dividing the amount of the fluorescent light of the reference data with the amount of the fluorescent light of the measurement data,
  wherein the irradiation target includes at least one substance emitting fluorescent light in response to the light irradiation.

According to the first embodiment of the present invention, the reference data and the measurement data may be raw data output from a sensor or normalized with root mean square of amounts of the fluorescent light detected over a predetermined wavelength range.

According to the first embodiment of the present invention, the light irradiating the irradiation target may be ultraviolet light in a wavelength range of UV A or UV-B.

According to the first embodiment of the present invention, the method may further comprise a step of providing the determined UV coverage to a user as a color indication.

According to the first embodiment of the present invention, the method may further comprise a step of providing an alert of reapplying the sunscreen to a user when the UV coverage is less than a predetermined threshold value.

According to the first embodiment of the present invention, the irradiation target may be a dummy sample including at least one substance included in human skin and emitting fluorescent light in response to irradiation of ultraviolet light, or the irradiation target may be human skin.

A second embodiment of the present invention provides a device for determining UV coverage in real time, comprising:
  a light source for irradiating an irradiation target with light, wherein a sunscreen is applied to the irradiation target;

an optical sensor for detecting an amount of fluorescent light emitted from the irradiation target in response to the light irradiation; and a control unit for controlling the light source and the optical sensor, wherein the control unit is configured to store the amount of the fluorescent light emitted from the irradiation target in response to the light irradiation immediately after applying the sunscreen on the irradiation target as reference data, wherein the control unit is configured to store the amount of the fluorescent light emitted from the irradiation target in response to the light irradiation after a predetermined passage of time from the application of the sunscreen or after applying a predetermined stress on the sunscreen as measurement data, wherein the control unit is configured to determine UV coverage by dividing the amount of the fluorescent light of the reference data with the amount of the fluorescent light of the measurement data, and wherein the irradiation target comprises at least one substance emitting fluorescent light in response to the light irradiation.

According to the second embodiment of the present invention, the control unit may be configured to use raw data output from the optical sensor as the reference data and the measurement data, or configured to normalize the reference data and the measurement data with the root mean square of the amounts of the fluorescent light detected over a predetermined wavelength range.

According to the second embodiment of the present invention, the light source may be configured to emit ultraviolet light within a wavelength range of UV-A or UV-B.

According to the second embodiment of the present invention, the device may further comprise a display unit configured to provide the determined UV coverage to a user as a color indication.

According to the second embodiment of the present invention, the control unit may be configured to provide an alert of reapplying the sunscreen to a user when the UV coverage is less than a predetermined threshold value.

According to the second embodiment of the present invention, the irradiation target may be a dummy sample comprising at least one substance included in human skin and emitting fluorescent light in response to irradiation of ultraviolet light, or the irradiation target may be human skin.

Effect of Invention

According to embodiments of the present invention, a method and a device for determining a UV coverage on an irradiation target in real time are provided.

BRIEF DESCRIPTIONS OF FIGURES

FIG. 3 shows a diagram showing changes of UV coverage measured by a method for determining UV coverage according to an embodiment of the present invention.

FIG. 4 shows a schematic diagram showing an example of a display unit of the device for determining UV coverage according to an embodiment of the present invention.

EMBODIMENTS

Figure 1:
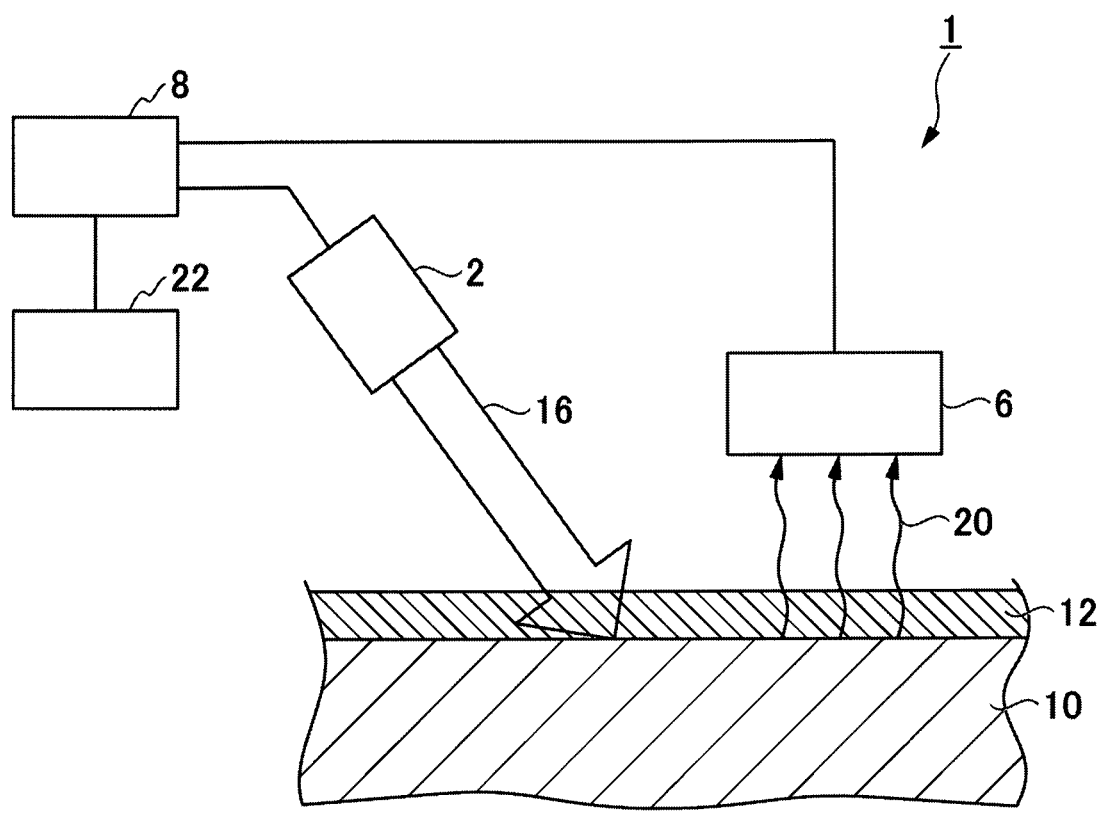
FIG. 1 shows a schematic diagram showing a device for determining UV coverage according to an embodiment of the present invention.

A device 1 for determining UV coverage according to some embodiments of the present invention may comprise a light source 2; an optical sensor 6; and a control unit 8 for controlling the light source 2 and the optical sensor 6 as shown in FIG. 1. The light source 2 may emit light 16 including ultraviolet light and irradiate an irradiation target 10. The irradiation target 10 may comprise at least one substance emitting fluorescent light in response to light, in particular, ultraviolet light. The fluorescent light 20 emitted from the irradiation target 10 may impinge the optical sensor 6. The optical sensor 6 may detect an amount of the fluorescent light 20. If light in a wide wavelength range, for example, light 16 reflected and/or scattered on the irradiation target 10 or ambient light impinges the optical sensor 6, noise may be caused or a background signal may be increased. Therefore, an SN ratio of the detection signal may be decreased. Thus, a filter (not shown) for allowing passage of only light having a predetermined wavelength range may be optionally attached to the optical sensor 6, or disposed between the optical sensor 6 and the irradiation target 10. The filter may allow passage of light in a wavelength range including a wavelength of the fluorescent light 20, for example, a wavelength range between 390 and 500 nm.

The light source 2 may emit light 16 including ultraviolet light. For example, the light source 2 may emit light having a wide wavelength range including ultraviolet light, visible light, and infrared light. Alternatively, the light source 2 may emit only ultraviolet light. For example, the light source 2 may be an ultraviolet light LED emitting monochromatic ultraviolet light having a wavelength of UV-A or UV-B, or more specifically, ultraviolet light having a wavelength of 365 nm. Since such an ultraviolet light LED has a low power consumption and a small form factor, the ultraviolet light LED is advantageously incorporated in a portable and/or handheld device. If the light 16 is reflected and/or scattered on the irradiation target 10 and impinges the optical sensor 6, a noise may be caused or a background signal may be increased. Therefore, the light source 2 may optionally comprise a filter allowing passage of only light having a required wavelength range. Furthermore, in order to prevent the light 16 reflected on the irradiation target 10 from impinging the optical sensor 6, the light source 2 and the optical sensor 6 may optionally comprise polarization filters, respectively.

The irradiation target 10 may be, for example, human skin. Human skin comprises at least one fluorescent substance which may emit fluorescent light in, for example, a visible wavelength range in response to the irradiation of light, in particular, ultraviolet light. Such a substance may be, for example, collagen, NADPH, amino acids, and the like. Alternatively, the irradiation target 10 may be a dummy sample comprising fluorescent substances similar to those included in human skin, for example, pig skin, cultured human skin, and a gel of a human skin model.

A sunscreen 12 may be applied on the irradiation target 10. The sunscreen 12 may comprise substances absorbing and/or reflecting ultraviolet light.

The device 1 may comprise a display unit 22. The display unit 22 may have a function, for example, providing a measurement result to a user. The display unit 22 may be controlled by the control unit 8.

Hereinafter, a method 100 for determining UV coverage using the device 1 for determining UV coverage having such a configuration is described with reference to FIG. 2.

In a step 102, the irradiation target 10, for example, human skin, immediately after applying the sunscreen 12 is irradiated with light 16 emitted from the light source 2.

In a step 104, the irradiation target 10 may emit fluorescent light in response to the irradiation of light, in particular, ultraviolet light. The fluorescent light may have, for example, a wavelength within a visible range.

In a step 106, an amount of the fluorescent light emitted from the irradiation target 10 is detected by the optical sensor 6. The optical sensor 6 may detect an amount of the fluorescent light in, for example, a predetermined wavelength range.

In a step 108, the control unit 8 stores the amount of the fluorescent light detected by the optical sensor 6 as a reference data. The amount of the fluorescent light may be normalized by, for example, the root mean square (RMS) of the amount of the fluorescent light detected over a predetermined wavelength range. Alternatively, a raw data output from the optical sensor 6 may be used as the reference data.

In a step 110, after passage of a predetermined time from the application of the sunscreen or after applying a predetermined stress on the sunscreen 12, the irradiation target 10 is irradiated with light 16 emitted from the light source 2. The predetermined stress may be, for example, wiping with a paper towel and/or washing with water.

In a step 112, the irradiation target 10 emits fluorescent light in response to irradiation of light, in particular, ultraviolet light. The fluorescent light may have a wavelength in, for example, visible light range.

In a step 114, an amount of the fluorescent light emitted from the irradiation target 10 is detected by the optical sensor 6.

In a step 116, the control unit 8 stores the amount of the fluorescent light detected by the optical sensor 6 as measurement data. The amount of the fluorescent light may be normalized by, for example, root mean square (RMS) of the amount of the fluorescent light detected over a predetermined wavelength range. Alternatively, a raw data output from the optical sensor 6 may be used as the measurement data.

In a step 118, the control unit 8 determines UV coverage by dividing the reference data with the measurement data.

In a step 120, the control unit 8 causes the display unit 22 to indicate the UV coverage. The indication of the UV coverage may be done by, for example, indicating a value. A graph may be also displayed. In order for a user to be able to more visibly and more intuitively understand the result, a color indication may be displayed with a graph having a plurality of predetermined colors.

Figure 2:
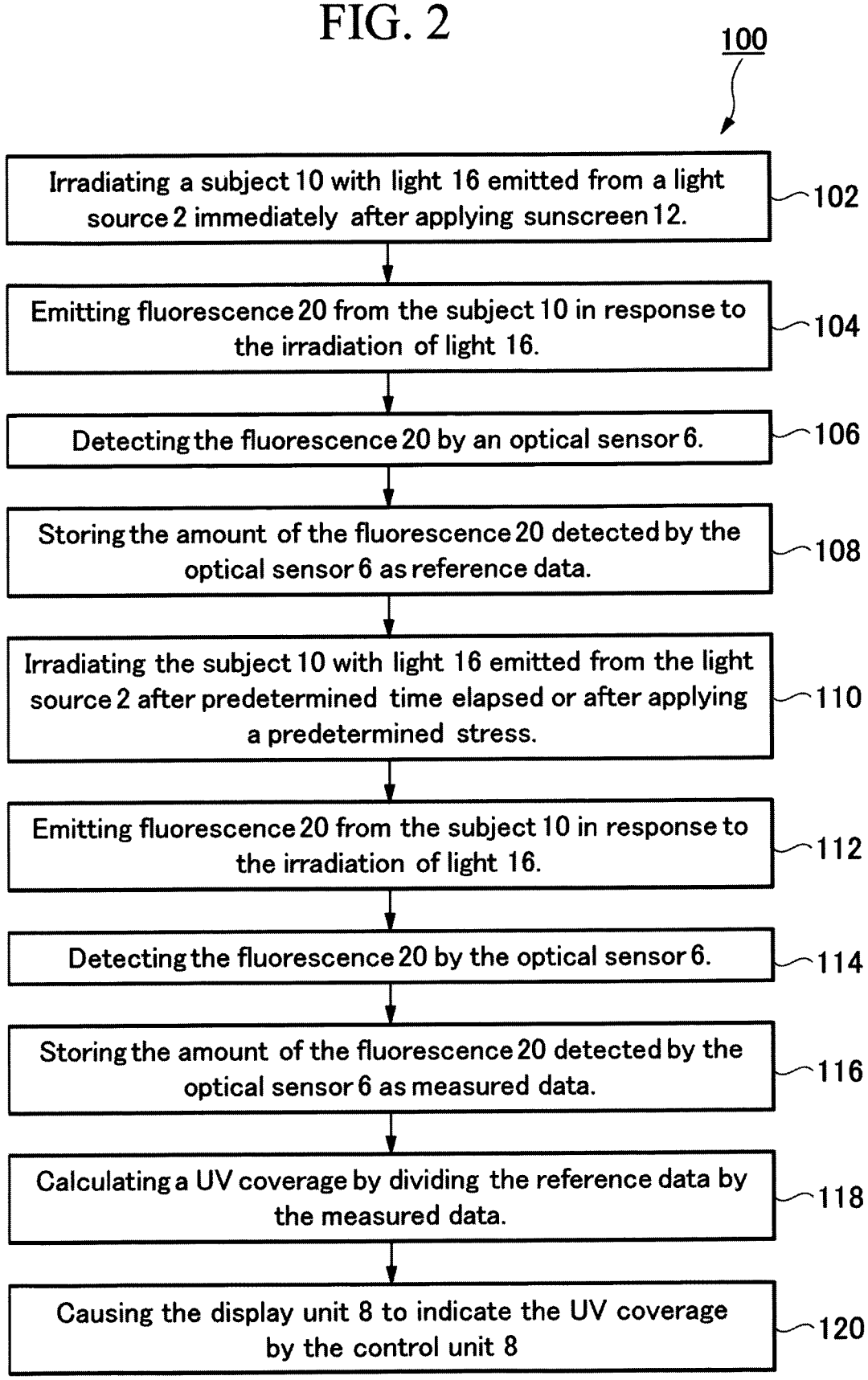
FIG. 2 shows a schematic flow diagram showing a method for determining UV coverage according to an embodiment of the present invention.

Accordingly, the method shown in FIG. 2 may determine the UV coverage on the irradiation target 10 in real time.

For example, since the light 16 irradiating the irradiation target 10 is shielded by the sunscreen 12 immediately after applying the sunscreen, the amount of the detected fluorescent light, in other words, the reference data has a significantly small value. The UV coverage may be 100% because the UV coverage is determined by dividing the reference data with the reference data itself. After passage of a predetermined time from the application of the sunscreen and/or after applying a predetermined stress on the sunscreen 12, the effect of shielding the light 16 by the sunscreen 12 may be decreased. Therefore, the amount of the detected fluorescent light, in other words, the measurement data is increased. The UV coverage will be a value less than 100% because the reference data is divided by the measurement data. Decreasing the effect of the sunscreen 12 results in the smaller UV coverage.

Table 1 shows a comparison of UV coverage measured by a conventional method and UV coverage measured by the method according to the embodiment of the present application immediately after applying a sunscreen 12 and after applying predetermined stresses. The irradiation target 10 in Table 1 is a human forearm. The measurements were carried out on five subjects, and the average values of the measurements were employed as data. The sunscreen 12 of PA++++ O/W type SPF 50+ were applied on the irradiation target 10 with an amount of 2.0 mg/cm$^2$. The sunscreen of O/W type means a formulation of oil dispersed in water. The first and second stresses are wiping with a dry paper towel. The third stress is wiping with alcohol. The UV coverage by the conventional method is obtained by the following equation:

$$UV \text{ Coverage } [\%] = \frac{x_0 - x_{mes}}{x_{mes}} \times 100$$

where $x_0$ is an amount of fluorescent light before applying the sunscreen, and $x_{mes}$ is a measurement value of fluorescent light at each step, for example, immediately after applying the sunscreen or after applying the first, second, or third stress.

The UV coverage by the method according to the present invention is obtained by the following equation:

$$UV \text{ Coverage } [\%] = \frac{x_i}{x_{mes}} \times 100$$

where $x_i$ is an amount of fluorescent light immediately after applying the sunscreen, and $x_{mes}$ is a measurement value of fluorescent light at each step, for example, after applying the first, second, or third stress.

TABLE 1

| | UV coverage obtained by the conventional method and the method according to the present invention | | | | |
|---|---|---|---|---|---|
| | Before applying sunscreen | Immediately after applying sunscreen | After applying the first stress (paper towel) | After applying the second stress (paper towel) | After applying the third stress (alcohol) |
| Average of the measurements | 295.75 | 71.25 | 139.00 | 172.25 | 220.50 |
| UV coverage by the conventional method | | 75.91% | 53.00% | 41.76% | 25.44% |

TABLE 1-continued

UV coverage obtained by the conventional method
and the method according to the present invention

|  | Before applying sunscreen | Immediately after applying sunscreen | After applying the first stress (paper towel) | After applying the second stress (paper towel) | After applying the third stress (alcohol) |
|---|---|---|---|---|---|
| UV coverage by the method of the present invention |  | 100.00% | 51.26% | 41.36% | 32.31% |

The difference between the UV coverage immediately after applying the sunscreen and after applying the first stress obtained by the conventional method is 22.91 points, while the difference between the UV coverage immediately after applying the sunscreen and after applying the first stress obtained by the method according to the present invention is 48.74 points. The sensitivity of the decrease of the UV coverage of the present invention can be said to be more than twice that of the conventional method. Therefore, the method according to the present invention can evaluate the change of the UV coverage due to stress applications with higher sensitivity. In other words, the method according to the present invention can evaluate the increase of the effect of ultraviolet light reaching the irradiation target 10, for example, human skin, due to the decreased effect of the sunscreen with higher sensitivity. Since the presence or absence of skin damage due to exposure to ultraviolet light is a major concern for users, the UV coverage by the method of the present invention, which can monitor the increase of the ultraviolet light, may be a more user-oriented evaluation index for users to understand and use compared to the conventional UV coverage determining methods based on the shielded ultraviolet light or based on the decrease of the ultraviolet light compared with the bare skin.

FIG. 3 shows graphs showing changes of UV coverage obtained by the method according to the present invention. FIGS. 3(a) and 3(b) show measurements of a cheek and a forehead of a human face, respectively, with applying sunscreens of type A and type B formulations. The type A is a formulation with oil dispersed in water (referred to as O/W type), wherein the majority is water. The type B is a formulation with water droplets dispersed in a continuous phase oil (referred to as W/O type). These are two representative rheology types commonly seen in the market. T0 is the measurement result before applying the sunscreen. T1 is the measurement result immediately after applying the sunscreen. T2 is a measurement result after spraying water in order to simulate the stress of getting wet after applying the sunscreen. T3 is a measurement result after cycling for 10 minutes. T4 is a measurement result after wiping with a paper towel. As shown in FIGS. 3(a) and 3(b), it can be seen that the UV coverage can be reproducibly measured in any region of the face and at any stage. The results shown in FIGS. 3(a) and 3(b) show that the type B has the UV coverage slightly higher than the type A sunscreen, but the difference is substantially within a range of error. Therefore, it is shown that the device and method of the present invention can reproducibly measure the UV coverage for any types of formulations of sunscreens.

FIG. 4 shows an example of a device 1 for determining UV coverage according to some embodiments of the present invention. FIG. 4(a) shows a schematic exterior view of the device 1, and FIGS. 4(b) and 4(c) are illustrative views of the display unit 22 of the device 1. The display unit 22 may be appropriately shaped to match the shape of the enclosure 24 of the device 1 and considering an aesthetic appearance. In the example shown in FIG. 4, the display unit 22 has a circular shape since the display unit 22 is disposed on the top surface of the approximately cylindrical enclosure 24, but it is not limited to this shape.

The device 1 may provide a determined UV coverage to a user through the display unit 22. For example, the UV coverage may be displayed as a value shown in Table 1. Alternatively, the UV coverage may be provided as a plurality of levels such as A, B, C, . . . such that the user may more intuitively understand the result. Alternatively, it is possible to provide a color indication as a color coded graph. FIG. 4(b) shows high UV coverage, for example, a state immediately after applying the sunscreen. The display unit 22 shows the level of the UV coverage as "A", and shows the full ring color indication. FIG. 4(c) shows a state having decreased UV coverage compared with FIG. 4(b). The level of the UV coverage is "B", indicated as a partial lack of ring color indication. With such an indication, the user can easily and intuitively check the change of the UV coverage, and recognize the state of the sunscreen.

Furthermore, the device 1 may provide an alert to the user when, for example, the determined UV coverage is less than a predetermined threshold value. For example, the alert may be embodied with audio, visual indication in the display unit 22, or indication on user's smartphone via a network. The alert may warn the user that the effect of the sunscreen has been decreased and that the sunscreen should be reapplied.

Although the specific embodiments of the present invention were described, those skilled in the art would easily understand that various changes, modifications and improvements are possible without departing from the technical spirit and scope of the present invention.

DESIGNATIONS

1: Device for determining UV coverage
2: Light source
6: Optical sensor
8: Control unit
10: Irradiation target
12: Sunscreen
16: Light
20: Fluorescent light
22: Display unit
24: Enclosure

The invention claimed is:

1. A method for determining UV coverage on an irradiation target in real time, comprising steps of:
   irradiating an irradiation target with light immediately after applying a sunscreen;
   detecting an amount of fluorescent light emitted from the irradiation target in response to the light irradiation and storing the amount of the fluorescent light as reference data;
   irradiating the irradiation target with light after a predetermined passage of time, or after applying a predetermined stress on the sunscreen;
   detecting an amount of fluorescent light emitted from the irradiation target in response to the light irradiation and storing the amount of the fluorescent light as measurement data; and
   determining a decrease of UV coverage by obtaining a value by dividing the amount of the fluorescent light of the reference data with the amount of the fluorescent light of the measurement data, and subtracting the value from 1,
   wherein the irradiation target includes at least one substance emitting fluorescent light in response to the light irradiation.

2. The method according to claim 1, wherein the reference data and the measurement data are raw data output from a sensor or normalized data with root mean square of amounts of the fluorescent light detected over a predetermined wavelength range.

3. The method according to claim 1, wherein the light irradiating the irradiation target is ultraviolet light in a wavelength range of UV-A or UV-B.

4. The method according to claim 1, further comprising a step of providing the determined UV coverage to a user as a color indication.

5. The method according to claim 1, further comprising a step of providing an alert of reapplying the sunscreen to a user when the UV coverage is less than a predetermined threshold value.

6. The method according to claim 1, wherein the irradiation target is a dummy sample including at least one substance included in human skin and emitting fluorescent light in response to irradiation of ultraviolet light, or wherein the irradiation target is human skin.

7. A device for determining UV coverage in real time, comprising:
   a light source for irradiating an irradiation target with light, wherein a sunscreen is applied to the irradiation target;
   an optical sensor for detecting an amount of fluorescent light emitted from the irradiation target in response to the light irradiation; and
   a control unit for controlling the light source and the optical sensor,
   wherein the control unit is configured to store the amount of the fluorescent light emitted from the irradiation target in response to the light irradiation immediately after applying the sunscreen on the irradiation target as reference data,
   wherein the control unit is configured to store the amount of the fluorescent light emitted from the irradiation target in response to the light irradiation after a predetermined passage of time from the application of the sunscreen or after applying a predetermined stress on the sunscreen as measurement data,
   wherein the control unit is configured to determine a decrease of UV coverage by obtaining a value by dividing the amount of the fluorescent light of the reference data with the amount of the fluorescent light of the measurement data, and subtracting the value from 1, and
   wherein the irradiation target comprises at least one substance emitting fluorescent light in response to the light irradiation.

8. The device according to claim 7, wherein the control unit is configured to use raw data output from the optical sensor as the reference data and the measurement data, or configured to normalize the reference data and the measurement data with root mean square of the amounts of the fluorescent light detected over a predetermined wavelength range.

9. The device according to claim 7, wherein the light source is configured to emit ultraviolet light within a wavelength range of UV-A or UV-B.

10. The device according to claim 7, further comprising a display unit configured to provide the determined UV coverage to a user as a color indication.

11. The device according to claim 7, wherein the control unit is configured to provide an alert of reapplying the sunscreen to a user when the UV coverage is less than a predetermined threshold value.

12. The device according to claim 7, wherein the irradiation target is a dummy sample comprising at least one substance included in human skin and emitting fluorescent light in response to irradiation of ultraviolet light, or wherein the irradiation target is human skin.

* * * * *